April 18, 1939.  W. D. CORLETT  2,154,494
VALVE TAPPET AND ADJUSTING SCREW ASSEMBLY
Filed Feb. 17, 1938
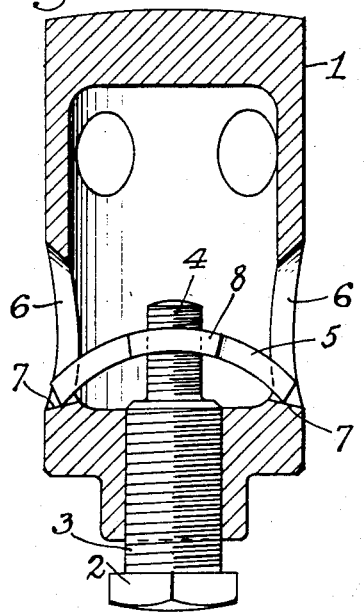
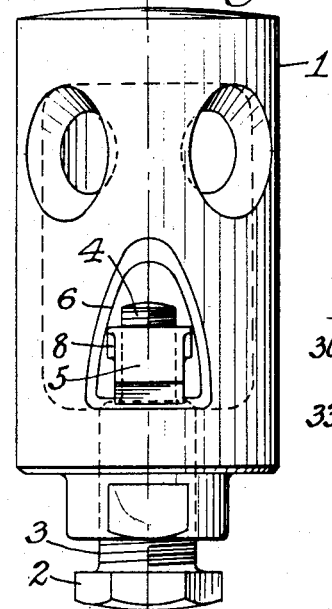
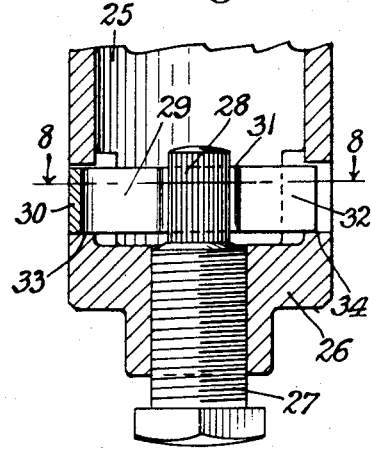
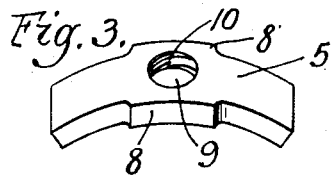
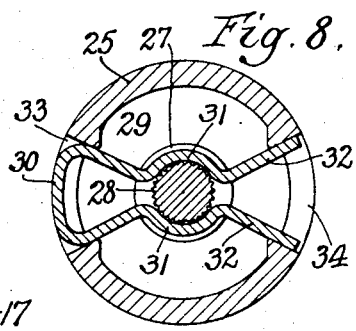
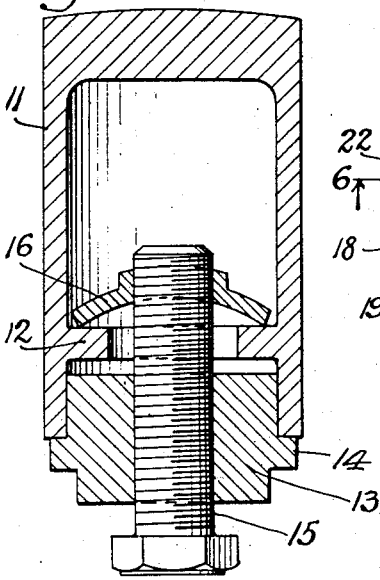
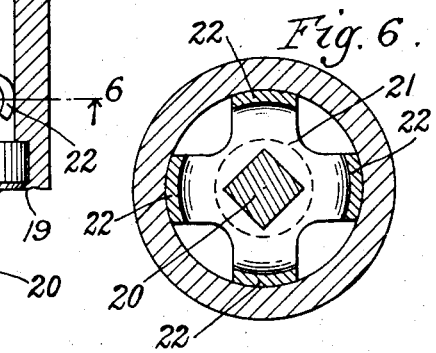
Inventor
Webster D. Corlett
by Parker Painter
Attorneys.

UNITED STATES PATENT OFFICE 2,154,494

VALVE TAPPET AND ADJUSTING SCREW ASSEMBLY

Webster D. Corlett, Oak Park, Ill., assignor to Standard Screw Company, Hartford, Conn., a corporation of New Jersey Application February 17, 1938, Serial No. 190,954

11 Claims. (Cl. 123—90)

My invention relates to an improvement in valve tappets and relates particularly to an adjusting screw lock available for use with valve tappets. One purpose is for the provision of improved means for locking the valve tappet adjusting screw in position. Another purpose is avoidance of the employment of an exterior lock nut for valve tappets whereby the overall length of the tappet and adjusting screw may be reduced. Other purposes appear from time to time in the course of the specification and claims. I illustrate my invention more or less diagrammatically in the accompanying drawing, wherein Figure 1 is a side elevation;
Figure 2 is a section along the line 2—2 of Figure 1;
Figure 3 is a detail;
Figure 4 is an axial section through a modified form of the device;
Figure 5 is an axial section through a further modified form;
Figure 6 is a section from the line 6—6 of Figure 5;
Figure 7 is an axial section through a still further modified form;
Figure 8 is a section along the line 8—8 of Figure 7.

Like parts are indicated by like symbols throughout the specification and drawing.

Referring first to Figures 1 to 3, I generally indicates a valve tappet body into the end of which an adjusting screw 2 is screw threaded. It includes a portion 3 of one diameter and an extension or portion 4 of somewhat smaller diameter. The screw threaded upon portion 4 is a spring or diversely extending member 5 preferably of spring stock. Ports are indicated as at 6 although they are not essential. When ports are employed as shown in Figures 1 and 2, the ends of the spring may penetrate such ports and abut against the walls thereof as at 7—7. The spring 5 may be centrally enlarged as at 8 and apertured as at 9, the aperture 9 being internally screw threaded as at 10. The threads of the screw portions 3 and 4 are preferably of slightly different pitch, the threads of the portion 4 being of somewhat coarser pitch. The result is that when the screw 2 is rotated, the coarser pitch of the portion 4 will draw the spring 5 up into a more compressed state as the screw advances. This compression of the spring 5 also tends to distort the aperture 9 in the spring, making it fit more tightly on the portion 4 of the screw. The lengths of thread on the screw are so designed that when the screw is in the adjusted position, there is enough compression in the spring 5 so that the downward force of the spring 5 acts against the threads of the portion 3, drawing them against the opposite threads in the tappet and creating enough friction to prevent the screw from turning in the ordinary use. However, there is not enough compression to prevent adjustment with a wrench, requiring, for example, a minimum of 28 inch pounds to turn the screw. Thus, there is enough compression to prevent unintended rotation of the screw, for example, because of vibration in use, while there is insufficient compression to prevent desired movement of the screw by a wrench when removal or adjustment of the screw is necessary.

Preferably the differential between the threads on the two portions of the screw 2 is such that the final adjustment which takes place in one or two turns of the screw 2, does not move the spring 5 sufficiently to cause an appreciable change of torque. It is to be understood, of course, that the diameter and pitch of the two screw threaded portions may be substantially varied.

Whereas, I have shown and described a tappet screw having portions of varied diameter, I do not wish to be limited thereto. It is possible to employ a continuous one diameter thread on the screw 2 and to preload the spring 5 so that it is under compression when the screw is assembled. In this way the spring 5 can be employed as a locking means. However, I find the differential thread arrangement an efficient way of subjecting the spring to load.

In assembling and when used with a ported tappet, the spring may be inserted through the ports 6 in the side walls of the tappet 1.

Referring to Figure 4, I illustrate an unported tappet body having a body portion 11 with an internal ledge 12 and an enclosure or plug 13, having a limiting ledge 14. I may then employ a tappet screw 15 shown in Figure 4 of uniform diameter. The inner end of the screw 15 receives the spring 16 which is screw threaded in relation thereto. When the screw 15 is rotated to engage the spring 16, the mating member 13 rotates with it so as to bring the spring into compression. When the spring 16 is under compression, it then serves to draw member 13 against member 11, thus not merely holding the screw in place against unintended movement, but also holding the tappet assembly together as a unit. It is understood that although in Figure 4 I illustrate an unported tappet body, the same structure may be applied to a ported tappet.

Referring to Figures 5 and 6 I illustrate a further variation in which an unported tappet body 17 has an enclosure 18 secured thereto by crimping or otherwise, as at 19. The adjusting screw 20 is screw threaded in the member 18. Secured to the inner end of the screw 20 is a leaf spring 21, shown in Figure 6 as cruciform. It has incurved ends 22 opposite to the inner walls of the member 17. The frictional relationship between the walls of the member 17 and the ends 22 of the spring 21 is such as to prevent unintended rotation of the adjusting screw 20, while permitting an intended rotation, for example, by a wrench. The spring 21 rotates with the screw 20 and may be secured thereto in any suitable fashion.

Referring to Figures 7 and 8, I illustrate a further variation in which the tappet body 25 with its end 26, receives the adjusting screw 27 in screw threaded relationship. The inner end of the adjusting screw 27 is knurled as at 28, this portion being shown as of smaller diameter than the screw threaded portion. I then illustrate a circumferential spring 29 having a loop 30, opposed portions 31 engaging opposite sides of the knurled portion 28 and ends 32. The loop extends into one port 33 and the ends are shown as extended into another port 34. The result is to obtain frictional action between portion 31 and the knurled portion 28, which is effective to prevent unintended rotation of the screw 27, while permitting its intended rotation for purposes of adjustment, removal or the like. It is understood, of course, that whereas I have shown the inner faces of the spring portions 31 as smooth, nevertheless, they may be knurled or provided with one or more projections, in order to permit an adjustment by the clicks or engagements of the opposed projections, when the screw is rotated in relation to the spring.

It will be realized that whereas I have described and shown a practical and operative device, nevertheless, many changes may be made in size, shape, number and disposition of parts without departing from the spirit of my invention.

I, therefore, wish my description and drawing to be taken as in a broad sense, illustrative or diagrammatic rather than limiting me to my specific showing herein.

I claim:

1. A valve tappet assembly which includes a hollow tappet body, an adjusting screw threaded therein, and means for holding said screw against unintended movement in relation to said body including a leaf spring transversely extending across the interior of said body and including portions engaging said body and said screw.

2. A valve tappet assembly which includes a hollow ported tappet body, an adjusting screw threaded therein, and means for holding said screw against unintended movement in relation to said body, including a leaf spring transversely extending across the interior of said body and including portions engaging said body and said screw, said leaf spring being located in general alignment with one or more of said ports.

3. A valve tappet assembly which includes a hollow ported tappet body, an adjusting screw threaded therein, and means for holding said screw against unintended movement in relation to said body, including a leaf spring transversely extending across the interior of said body having portions engaging said screw and penetrating said ports.

4. A valve tappet assembly which includes a tappet body, an adjusting screw threaded therein, and means for holding said screw against unintended movement in relation to said body, including a leaf spring, screw-threaded upon said screw and having portions engaging and normally flexed against said body.

5. A valve tappet assembly which includes a ported tappet body, an adjusting screw threaded therein, and means for holding said screw against unintended movement in relation to said body, including a leaf spring screw-threaded upon said screw and having portions penetrating said ports.

6. A valve tappet assembly which includes a hollow tappet body, an adjusting screw, the adjusting screw having a screw-threaded portion of reduced diameter, and a transversely extending leaf spring screw-threaded upon said portion of reduced diameter, and having portions engaging the tappet body.

7. A valve tappet assembly which includes a hollow tappet body, an adjusting screw screw-threaded into one end of said body, and having an exterior head, and means within said tappet body for preventing unintended rotation of said screw, including a transversely extending leaf spring having portions engaging said screw and said tappet body.

8. A valve tappet assembly which includes a hollow ported tappet body, an adjusting screw threaded into an end thereof, and means for holding said screw against unintended movement in relation to said body, including a leaf spring within said body and alined with a port in said body, said leaf spring including a portion in screw-threaded relation with said adjusting screw.

9. A valve tappet assembly which includes a hollow ported tappet body, an adjusting screw threaded into an end thereof, and means for holding said screw against unintended movement in relation to said body, including a leaf spring within said body and alined with a port in said body, said leaf spring including a portion in screw-threaded relation with said adjusting screw, and ends flexed against opposed portions of said body.

10. A valve tappet assembly which includes a hollow tappet body, an adjusting screw screw-threaded into one end of said body, and having an exterior head, and means within said tappet body for preventing unintended rotation of said screw, including a transversely extending leaf spring having portions engaging said screw and said tappet body, the portion of said screw opposed to said leaf spring being knurled for frictional engagement.

11. A valve tappet assembly which includes a hollow tappet body, an adjusting screw screw-threaded into one end of said body, and having an exterior head, and means within said tappet body for preventing unintended rotation of said screw, including a transversely extending leaf spring having portions engaging said screw and said tappet body, the portion of said screw opposed to said leaf spring being knurled for frictional engagement, said leaf spring including opposed portions adapted substantially to surround the roughened portion of said screw.

WEBSTER D. CORLETT.